United States Patent Office 3,823,169
Patented July 9, 1974

3,823,169
QUATERNARY ANTHRAQUINONE DYESTUFFS
Alfred Staub, Binningen, Switzerland, assignor to Ciba-Geigy AG, Basel, Switzerland
No Drawing. Filed Apr. 12, 1971, Ser. No. 133,379
Claims priority, application Switzerland, Apr. 14, 1970, 5,494/70
Int. Cl. C09b 1/28
U.S. Cl. 260—378                                    6 Claims

ABSTRACT OF THE DISCLOSURE

A cationic anthraquinone dyestuff, the cationic portion of which is free of groups that dissociate acidly in water and corresponds to the formula

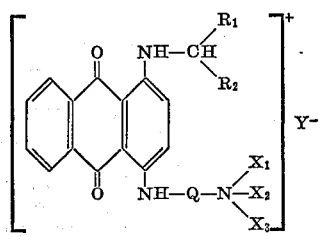

(I)

wherein $R_1$ and $R_2$ each represent a lower alkyl group, Q represents a lower alkylene group, $X_1$ and $X_2$ each denotes an optionally substituted lower alkyl group, or $X_1$ and $X_2$ together with the nitrogen atom that unites them and, optionally with inclusion of a further hetero atom, represent a heterocyclic radical, $X_3$ represents an optionally substituted alkyl, cycloalkyl or arylalkyl radical, and Y represents the anion equivalent of an inorganic or organic acid.

The invention relates to new cationic anthraquinone dyestuffs, process for their manufacture, their use in the dyeing or printing of synthetic, acid groups containing textile fibres and as an industrial product, and the synthetic, acid modified fibre material dyed or printed with these dyestuffs.

The invention provides valuable cationic anthraquinone dyestuffs which in the cationic portion do not contain any groups that dissociate acidly in water and correspond to the following formula I

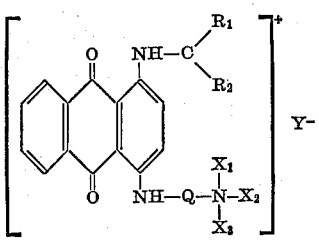

(I)

wherein $R_1$ and $R_2$ represent lower alkyl groups, Q represents a lower alkylene group, $X_1$ and $X_2$ each denotes an optionally substituted lower alkyl group, or $X_1$ and $X_2$ together with the nitrogen atom that unites them and, optionally with inclusion of a further hetero atom, represent a heterocyclic radical, $X_3$ represents an optionally substituted alkyl, cycloalkyl or arylalkyl radical, and Y represents the anion equivalent of an inorganic or organic acid.

By groups that dissociate in water and are not contained in the dyestuff cation, are meant in this context and hereafter the known substituents that give the dyesuffs anionic characer, for example sulphonic acid, carboxylic acid and phosphoric acid groups.

$R_1$ and $R_2$ possess advantageously together at most 6 carbon atoms. $R_1$ represents especially the methyl group, $R_2$ above all the methyl or ethyl group.

The lower alkylene group Q can be straight-chain or branched; in the first case it is preferably the 1,2-ethlene or 1,3-propylene group, and in the latter case, it is, for example, the 2-methyl-1,2-ethylene, 2-methyl-1,2-methyl-1,3-propylene or 2,2-dimethyl-1,3-propylene group.

Where $X_1$ and $X_2$ represent a lower alkyl radical, this is, for example, the methyl, ethyl, isopropyl or butyl group. If the alkyl radicals $X_1$ and $X_2$ are substituted, suitable substituents are, for example, halogens such as chlorine or bromine, the cyanogroup, the hydroxyl group, lower alkoxy groups, lower alkanoyloxy groups, lower alkoxycarbonyl groups or carbamoyl groups. Exemplary of such substituted alkyl radicals are the β-chloroethyl or β-bromoethyl group, the β-cyanoethyl, β-hydroxyethyl, β- or γ-hydroxypropyl, β,γ-dihydroxypropyl, γ-chloro-β-hydroxy - propyl - β - methoxyethyl or β-ethoxyethyl, γ-methoxypropyl or γ-ethoxypropyl, β-acetoxy or β-propionyloxyethyl, carbomethoxymethyl, carbethoxymethyl or β-carbamoylethyl group.

Where $X_1$ and $X_2$ together with the nitrogen atom common to both represent a heterocyclic radical, this latter contains preferably 5 or 6 ring members. The ring in question is, for example, the pyrrolidine or piperidine ring and, in case the hetero ring contains a further hetero atom, for example the pyrazoline or morpholine ring.

Preferably $X_1$ and $X_2$ are identical and represent a lower group, especially the methyl or ethyl group.

Where $X_3$ represents an alkyl radical, this is preferably straight-chain and has 1 to 6 carbon atoms. As constituents, this alkyl radical can have, for example, chlorine atoms or the hydroxy, alkoxy, cyano group, the carbamoyl group or a carbalkoxy group, for example the carbomethoxy or carbethoxy group.

Where $X_3$ represents an aralkyl group, this is preferably the phenyl-ethyl or benzyl radical. The latter is optionally ring substituted by halogen atoms, for example fluorine, chlorine or bromine, or lower alkyl groups, such as methyl or ethyl.

Where $X_3$ represents a cycloalkyl group, this is preferably the cyclohexyl radical. In preferred cationic dyestuffs of the formula I, $X_3$ represents the methyl, ethyl or the benzyl group.

As inorganic anion, Y represents, for example, the chlorine, bromine, iodine, phosphate or sulphate anion or the anion of a metallic hydrohalic acid, for example the $ZnCl_3$ anion. As organic anion, Y represents, for example, an acetate, alkylsulphate, an arylsulphonate, such as the benzene sulphonate or p-toluenesulphonate ion, or also the oxalate ion.

The term "lower" used in connection with "alkyl," "alkoxy," "alkanoyl," and "alkylene," is to be understood as meaning that the group, or the organic group, constituent contains not more than 4 carbon atoms, but above all 1 or 2, or 2 or 3 carbon atoms, respectively.

The new cationic anthraquinone dyestuffs of the formula I are manufactured by reacting an anthraquinone compound of the formula II

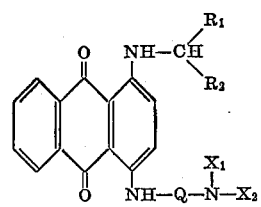

(II)

wherein $R_1$, $R_2$, Q, $X_1$ and $X_2$ have the meaning given for formula II, with a reactive ester of an aliphatic or araliphatic alcohol with an inorganic or organic acid of the formula III $$X_3—Y'$$  (III)

wherein $X_3$ has the meaning given for formula I and Y represents the acid radical corresponding to the anion Y, the starting materials being so chosen that the final dyestuff product does not have in the cationic portion any groups that dissociate acidly in water.

The starting materials of the formula II can be manufactured in a manner known *per se*, for example by reacting an anthraquinone compound of the formula IV

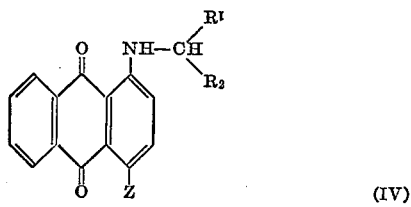

wherein $R_1$ and $R_2$ have the meaning given for formula I and Z represents halogen, for example fluorine or especially chlorine or bromine, the hydroxyl group, the methoxy group, the nitro or amino group, with an alkylenediamine of the formula V,

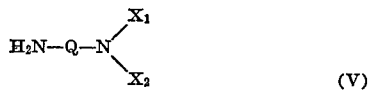

wherein Q, $X_1$ and $X_2$ have the meaning given for formula I.

Such starting materials can also be manufactured by reacting an anthraquinone compound of the formula VI,

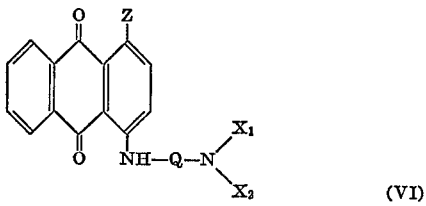

wherein Q, $X_1$ and $X_2$ have the meaning given for formula I and Z has the meaning given for formula IV, with a sec. alkylamine of the formula VII,

wherein $R_1$ and $R_2$ have the meaning given for formula I.

The reaction of the anthraquinone compound of the formula IV with the alkylenediamine of the formula V, or the reaction of the anthraquinone compound of the formula VI with the sec. alkylamine of the formula VII, respectively, takes place, for example, in the solution or in the melt of the excess alkylenediamine or the sec. alkylamine according to the definition, respectively, or in an organic solvent that does not participate in the reaction.

Suitable solvents are, for example, aromatic hydrocarbons, such as toluene, xylene or naphthalene, or halogenated or nitrated aromatic hydrocarbons, such as chlorobenzene, di- and trichlorobenzene, or nitrobenzene, or halogenated aliphatic hydrocarbons, such as trichloroethane, furthermore alcohols, for example lower alkanols, such as *n*-butanol, sec. butanol, or alkyleneglycol-monoalkyl ether or alkyleneglycol-monoethyl-ether, also aromatic hydroxyl compounds, for example phenol and homologues thereof, or tertiary nitrogen bases, such as pyridine.

Where anthraquinone compounds of the formula IV or formula VI, respectively are used, in which Z represents halogen, especially chlorine or bromine, the process is carried out advantageously in the presence of copper or a copper compound, for example copper-(I)-chloride, copper-(II)-bromine or copper-(II)-acetate, as also of an agent that neutralizes acid, and advantageously at elevated temperature.

As agent that neutralizes acid there is used particularly an excess of hte alkylenediamine or sec. alkylamine according to the definition, optionally together with an alkali salt of a lower fatty acid or of carbonic acid, for example sodium acetate or potassium acetate, respectively sodium bi-carbonate or sodium carbonate, or with an alkali metal hydroxide, for example sodium hydroxide or potassium hydroxide, or with magnesium oxide; furthermore, a tertiary amine, such as triisopropanolamine can also be used.

A suitable ester of the formula III with which the anthraquinone dyestuff of the formula II is reacted to give the ammonium compound of the formula I is, for example, the methyl, ethyl, hydroxyethyl, cyanomethyl, *n*-propyl, *n*-butyl, β-cyanoethyl, or benzyl ester of hydrochloric acid, hydrobromic acid, hydroiodic acid, dimethyl and diethyl sulphate, the methyl, β-chloroethyl, ethyl and butyl ester of benzenesulphonic acid or of *p*-toluenesulphonic acid, further the bromoacetic acid alkyl ester (having an alkyl radical with preferably - to 4 carbon atoms). Further alkylating agents are the following hydrohalic esters; hexylbromide, benzylbromide, chloroacetonitrile, chloroacetamide, 2-chloropropionic acid methyl ester, 3-chloro-propene, 2-chloro-ethanol, 3-chloro-propanol, 6-chloro-hexanol, glycerine-chlorohydrin, glycerine-dichlorohydrine and 3-methoxy-propylchloride. Instead of certain substituted alkanol esters, their preliminary products can also be used: for example, of β-cyanoethyl chloride or bromine or β-carbamoylethyl chloride or bromine, using acrylonitrile or acrylobromine respectively, in the presence of hydrochloric or hydobomic acid.

The reaction of an anthraquinone dyestuff of the formula II with an ester of the formula III to give the ammonium compound of the formula I is carried out appropriately by heating both substances in an organic solvent that does not participate in the reaction. Suitable solvents are, for example, optionally halogenated or nitrated aromatic hydrocarbons, for example toluene, xylenes, halogenbenzenes or nitrobenzenes, or optionally aliphatic hydrocarbons, for example chloroform, trichloroethylene, tetrachloroethylene, tetrachloroethane or trichloroethane; and cyclohexane.

The new ammonium compounds of the formula I occur in the form of salts of the acids of the alkanol esters or aralkanol esters according to the definition which are used for their manufacture, that is to say in the form of dye salts or inorganic or organic acids. These are, therefore, chlorides, bromides, iodides, methosulphates, ethosulphates, benzene sulphates or *p*-toluenesulphates. If desired, it is also possible to manufacture salts of other acids by means of double reaction in a suitable polar solvent, for example oxalates, by adding oxalic acid. Double salts can also be manufactured, for example, with the dyestuff halides and corresponding zinc or cadmium halides.

A technically very simple, and therefore preferred, embodiment of the invention for the manufacture of dye salts of the formula I, consists in condensing 1-sec. alkylaminoanthraquinone compounds of the formula IV, in which Z represents halogen, with an alkylenediamine of the formula V, and quaternating the resulting condensation product without isolation of the intermediate product.

Particularly valuable cationic anthraquinone dyestuffs according to the invention that are distinguished, inter alia, by very good accessibility, good fastness to washing, hot pressing and light and very good affinity for synthetic, acid modified textile fibres, chiefly polyacrylonitrile fibres, as also by very good stability in a boiling bath, correspond to the formula VIII

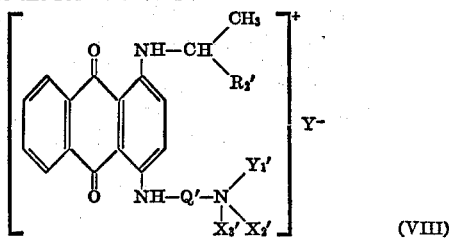

where $R'_2$ represents a methyl or ethyl group, $Q'$ represents an ethylene or propylene group, $X'_1$ and $X'_2$ each represents a methyl or an ethyl group, $X'_3$ represents a methyl, ethyl or benzyl group, and Y has the meaning given for formula I.

The new quaternated compounds of the formula I are more or less readily soluble in water, depending on the type of anion, and can be converted into lake forming dyestuffs or pigment dyestuffs by reaction with certain acids, such as heteropoly acids, or with acid dyestuffs. They are suitable for dyeing and printing mordanted cotton and leather. The quaternated dyestuffs of the invention are also suitable for dyeing natural polyamide, such as wool and chiefly silk, also for dyeing acid modified polypropylene fibres.

In particular, they are absorbed from aqueous, neutral or—advantageously—from weak acid solution, optionally in the presence of wetting agents having a dispersing action, as in the presence of condensation products of alkylene oxides with higher alkanols, almost wholly to completely onto synthetic, acid modified fibre material with open heating or in a sealed dye bath under pressure, and produce on this material pure blue dyeings that possess excellent fastness to washing, milling, hot pressing and light.

Cationic anthraquinone dyestuffs of the invention, together with known yellow cationic dyestuffs, are further suitable for producing compound dyeings that are particularly fast to hot pressing.

Exemplary of suitable synthetic, acid modified fibre materials that can be dyed or printed with the cationic anthraquinone dyestuffs of the invention are acid modified polyamides, such as polycondensation products of 4,4'-diamino - 2,2' - diphenylsulphonic acids, respectively 4,4'-diamino - 2,2' - diphenylalkanedisulphonic acids, with polyamide-forming starting materials, polycondensation products of monoaminocarboxylic acids, respectively their amide-forming derivatives, or dibasic carboxylic acids and diamines with aromatic dicarboxysulphonic acids, for example polycondensation products of caprolactam or hexamethylene-diammonium adipate with potassium-3,5-dicarboxybenzene sulphonate, or acid modified polyester fibres, such as polycondensation products of aromatic polycarboxylic acids, for example terephthalic acid or isophthalic acid with polyvalent alcohols, for example ethylene glycol and 1,2- or 1,3-dihydroxy-3(3-sodium - sulpho - propoxy) butane, 2,2-bis-(3-sodium-sulpho-propoxyphenyl)propane or 3,5-dicarboxybenzenesulphonic acid or sulphonated terephthalic acid, sulphonated 4-methoxy-benzenecarboxylic acid or sulphonated diphenyl-4,4'-dicarboxylic acid. Acid modified polyamide fibres are marketed by Messrs. Glanzstoff, for example under the name "Perlon N." Preferably, however, the materials are fibre materials of polyacrylonitrile or polyacrylonitrile polymers, respectiveiy. In the case of polyacrylonitrile copolymers, the acrylonitrile constituent is preferably 80% by weight of the copolymer. Besides the acrylonitrile, other vinyl compounds are used as comonomers, for example vinylidene chloride, vinylidene cyanide, vinyl chloride, methacrylate, methylvinylpyridine, N-vinylpyrrolidine, vinyl acetate, vinyl alcohol or styrenesulphonic acids.

The quaternated dyestuffs of the invention are also excellently suitable for dyeing blended fabrics of acrylic fibres and acid modified polyamide fibres.

The following Examples illustrate the invention, without, however, being limitative thereof.

Example 1

1 - Isopropylamino-4-(γ - dimethylamino)-propylamino-anthraquinone (36.5 g.) is dissolved in chlorobenzene (150 g.). The resulting solution is thereupon slowly mixed at 50° C. with dimethylsulphate (13 g.). The quaternary anthraquinone dyestuff of the formula

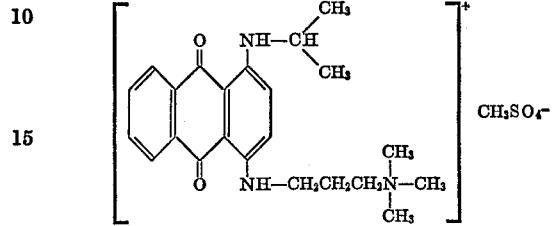

there is obtained in the process is filtered off, washed and dried. The melting point is 195–198° C. By recrystallisation from ethanol or butanol, a wholly pure product is obtained that melts at 198–200° C.

The resulting dye salt is in the form of a powder that has a blue bronze lustre, dissolves easily in water and dyes polyacrylonitrile fibres in brilliant blue shades from an acetic acid bath. The dyeings possess outstanding fastness to washing, hot pressing and light.

The 1-isopropylamino - 4 - (γ-dimethylamino)-propyl-amino-anthraquinone used in the above Example is obtained as follows:

1-Isopropylamino-4-bromo-anthraquinone (69 g.), γ-dimethylamino-propylamine (30.6 g.), anhydrous potassium acetate (20 g.) and copper(I)-chloride (0.5 g.), are heated to 95–100° C. within a period of 30 minutes and maintained at this temperature for 4 hours. The isopropylamino-4-(γ-dimethylamino) - propylamino-anthraquinone that is formed is precipitated from the reaction melt at 70° C. with water (150 g.) in the presence of the sodium salt of dinaphthylmethane-disulphonic acid, isolated by filtration after cooling, washed and dried. It can be purified by precipitation from diluted acetic acid or from cyclohexane. Yield: 95% of theory.

EXAMPLE 2

1-Isopropylamino-4-(γ - dimethylamino)-propylamino-anthraquinone (36.5 g.) is dissolved in chlorobenzene (150 g.). Thereafter benzylchloride (13 g.) is added dropwise to the resulting solution at 80° C. within 15 minutes. The quaternary anthraquinone compound of the formula

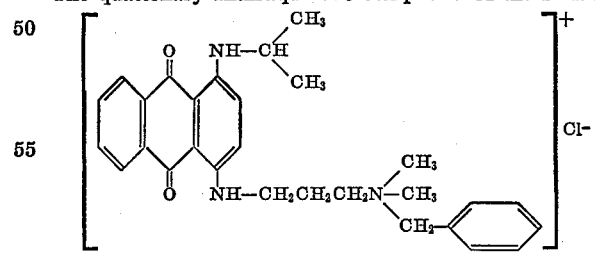

is precipitated in the form of crystals. The reaction mixture is maintained at 80° C., allowed to cool and the resulting dye salt is separated by filtration.

After the product has been dried, a powder is obtained that has a blue bronze lustre melts at 200–202° C. and dyes fibre materials from polyacrylonitrile in pure blue shades. The dyeings obtained with the above dyestuff on the fibre material mentioned posses tinctorial strength and excellent fastness to wet processing and light.

If the 1-isopropylamino-4-(γ-dimethylamino)-propyl-amino-anthraquinone compound is substituted in the foregoing Examples 1 and 2 by the equivalent amount of one of the anthraquinone compounds listed in column II of the following Table and this latter is reacted with equivalent amounts of one of the quaternating agents listed in column III under the conditions described in the above Examples, dye salts are obtained that produce dyeings of similarly good properties on polyacrylonitrile fibres, and the shades of which are indicated in the last column of the Table.

TABLE

| Example number | Anthraquinone compound | Quaternating agent | Shade on polyacrylonitrile fibres |
|---|---|---|---|
| 3 | (1-NH-CH(CH$_3$)$_2$, 4-NHCH$_2$CH$_2$CH$_2$N(C$_2$H$_5$)$_2$ anthraquinone) | Benzylbromide | Blue. |
| 4 | Same as above | Diethylsulphate | Do. |
| 5 | (1-NH-CH(CH$_3$)$_2$, 4-NHCH$_2$CH$_2$CH$_2$N(CH$_3$)$_2$ anthraquinone) | Bromoethyl acetate | Do. |
| 6 | (1-NH-CH(CH$_3$)$_2$, 4-NHCH$_2$CH$_2$N(piperidino) anthraquinone) | p-Toluenesulphonic acid methyl ester. | Do. |
| 7 | (1-NH-CH(CH$_2$CH$_3$)$_2$, 4-NHCH$_2$CH$_2$CH$_2$N(CH$_2$CH$_2$Cl)$_2$ anthraquinone) | Benzyl chloride | Do. |
| 8 | (1-NH-CH(CH$_3$)$_2$, 4-NHCH$_2$CH$_2$CH$_2$N(CH$_2$CH$_2$OH)$_2$ anthraquinone) | Diethyl sulphate | Do. |
| 9 | (1-NH-CH(H)(CH$_3$), 4-NHCH$_2$CH$_2$N(morpholino) anthraquinone) | Dimethylsulphate | Do. |
| 10 | (1-NH-CH(CH$_3$)(CH$_2$CH$_2$CH$_3$), 4-NHCH$_2$CH$_2$CH$_2$N(CH$_2$CH$_2$CN)$_2$ anthraquinone) | Benzyl chloride | Do. |

TABLE—Continued

| Example number | Anthraquinone compound | Quaternating agent | Shade on polyacrylonitrile fibres |
|---|---|---|---|
| 11 | 1-NH-CH(CH₃)(CH₂CH₃), 4-NH-CH₂CH₂CH₂-N(CH₃)₂ anthraquinone | Dimethyl sulphate | Blue |
| 12 | Same as above | Methylbenzyl chloride | Do. |
| 13 | 1-NH-CH(CH₃)₂, 4-NH-CH₂CH₂-N(CH₃)₂ anthraquinone | Dimethyl sulphate | Do. |
| 14 | 1-NH-CH(CH₃)₂, 4-NH-CH₂CH(CH₃)-N(CH₃)₂ anthraquinone | ....do.... | Do. |
| 15 | 1-NH-CH(CH₃)₂, 4-NHCH₂CH₂CH₂N(CH₂CH₂OCH₃)₂ anthraquinone | Benzylchloride | Do. |
| 16 | 1-NH-CH(CH₃)₂, 4-NHCH₂CH₂N(CH₂CH₂OCOCH₃)₂ anthraquinone | ....do.... | Do. |
| 17 | 1-NH-CH(CH₃)₂, 4-NHCH₂CH₂CH₂N(CH₂COOCH₃)₂ anthraquinone | ....do.... | Do. |
| 18 | 1-NH-CH(CH₃)₂, 4-NH-CH₂CH₂-N(CH₃)₂ anthraquinone | ....do.... | Do. |

TABLE—Continued

| Example number | Anthraquinone compound | Quaternating agent | Shade on polyacrylonitrile fibres |
|---|---|---|---|
| 19 | ![structure] 1,4-bis substituted anthraquinone with NH-CH(CH₃)₂ and NH-CH(CH₃)-CH₂-N(CH₃)₂ | Dimethyl sulphate | Blue. |
| 20 | Same as above | Benzyl chloride | Do. |
| 21 | | Diethyl sulphate | Do. |
| | 1,4-bis substituted anthraquinone with NH-CH(CH₃)₂ and NH-CH₂CH₂CH₂-N(CH₃)₂ | | |
| 22 | Same as above | $SO_2$—O—$C_2H_5$ with p-CH₃-phenyl | Do. |
| 23 | do | Ethyl bromide | Do. |
| 24 | do | n-Butyl bromide | Do. |
| 25 | do | n-$C_6H_{13}$-Br | Do. |
| 26 | 1,4-bis substituted anthraquinone with NH-CH(CH₃)₂ and NH-CH₂CH₂CH₂-N(CH₃)₂ | Cyclohexyl bromide | Do. |
| 27 | Same as above | HO—$CH_2CH_2$—Cl | Do. |
| 28 | do | Cl—$CH_2$—CO—$NH_2$ | Do. |
| 29 | do | Cl—$CH_2$—CN | Do. |

Example 30

1-sec. Butylamino-4-bromo-anthraquinone (71 g.), γ-dimethylamino-propylamine (30.6 g.), anhydrous potassium acetate (20 g.) and copper (I)-chloride (0.25 g.) are heated within 30 minutes to 95–100° C., and maintained at this temperature for 4 hours, after which time the reaction melt is mixed with anhydrous xylene (350 g.) and dimethyl sulphate (50 g.) is added dropwise at 50° C. The quaternary dye salt of the formula

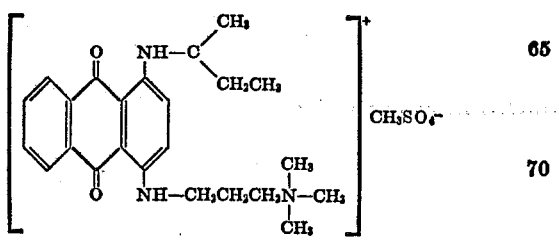

that precipitates in the process is then isolated by filtration and washed with warm xylene. After the product has been dried, a dyestuff (150 g.) is obtained that contains in addition the quaternary product from excess γ-dimethyl-aminopropylamine and dimethyl sulphate. This dyestuff dyes fibre material of polyacrylonitrile is strong blue shades. The dyeings possess good fastness to washing, hot pressing and light.

Dyeing Instruction

The dyestuff manufactured in accordance with Example 2 (0.5 g.) is made into a paste with 80% acetic acid (0.5) and dissolved in hot water (4000 g.). 80% acetic acid (1 g.), sodium acetate (2 g.) and 4 g. of a condensation product of oleic alcohol and 15 mols of ethylene oxide are further added. The pH value of the solution is approx. 4.5. Polyacrylonitrile fabric (100 g.) is introduced at 50° C., the temperature is raised within 15 minutes to 100° C. and dyeing carried out for 1 hour at boiling temperature, after which time the dye bath is practically exhausted. The dyed material is treated for 15 minutes at 80° C. with the solution of 5 g. of a fatty alcohol sulphonate and subsequently rinsed and dried. The material dyed in a clear, blue shade possesses excellent fastness to washing, hot pressing and light.

What is claimed is:

1. A cationic anthraquinone dyestuff, the cationic portion of which is free of groups that dissociate acidly in water and corresponds to the formula

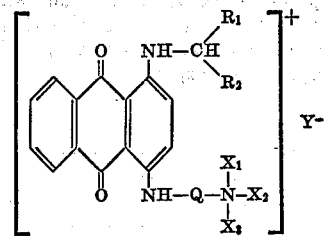

wherein $R_1$ and $R_2$ each represent alkyl of 1 to 6 carbon atoms, Q represents alkylene of 1 to 6 carbon atoms, $X_1$ and $X_2$ each is unsubstituted lower alkyl or lower alkyl substituted by chlorine, bromine, cyano, hydroxyl, lower alkoxy, lower alkanoyloxy, lower alkoxycarbonyl or carbamoyl, or $X_1$ and $X_2$ together with the nitrogen atom that unites them, represent pyrrolidine, pyrazoline, morpholine or piperidine, $X_3$ represents alkyl of 1 to 6 carbon atoms or alkyl of 1 to 6 carbon atoms substituted by chlorine, hydroxy, lower alkoxy, cyano, carbamoyl, carbomethoxy or carbethoxy, cyclohexyl or phenylethyl or benzyl, and Y represents the anion equivalent of an inorganic or organic acid.

2. A cationic anthraquinone dyestuff as claimed in claim 1, which corresponds the formula

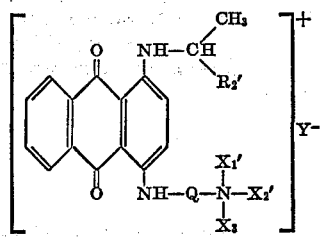

wherein $R_2'$ represents methyl or ethyl, Q' represents ethyl or propylene, $X_1'$ and $X_2'$ each represents methyl or ethyl, $X_3'$ represents methyl, ethyl or benzyl, and Y has the meaning given in claim 7.

3. A cationic anthraquinone dyestuff as claimed in claim 2, which corresponds to the formula

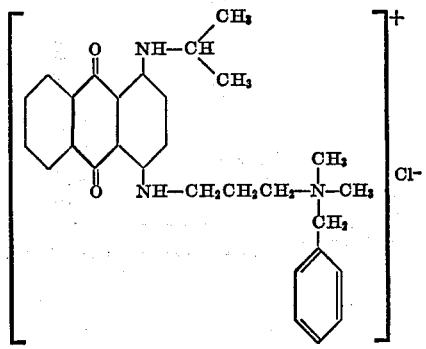

4. A cationic dyestuff as claimed in claim 1, which corresponds to the formula

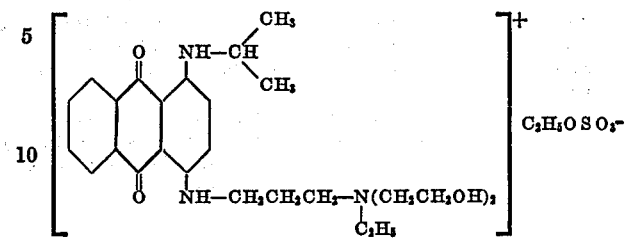

5. A cationic dyestuff as claimed in claim 1, which corresponds to the formula

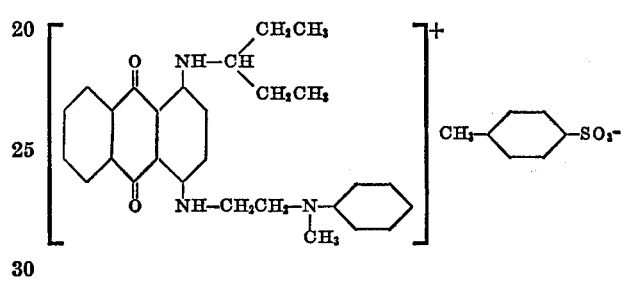

6. A cationic dyestuff as claimed in claim 1, which corresponds to the formula

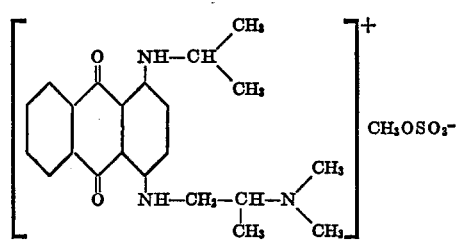

References Cited

UNITED STATES PATENTS

| | | | |
|---|---|---|---|
| 3,100,379 | 8/1963 | Kaiser et al. | 167—88 |
| 3,499,915 | 3/1970 | Schwandes et al. | 20—372 |

FOREIGN PATENTS

| | | | |
|---|---|---|---|
| 807,241 | 1/1959 | Great Britain | 260—378 |

LORRAINE A. WEINBERGER, Primary Examiner

R. GERSTL, Assistant Examiner

U.S. Cl. X.R.

8—39, 40; 260—247.5 R, 272, 312, 326.5 J, 378, 377